United States Patent [19]

Annis et al.

[11] 4,067,843

[45] Jan. 10, 1978

[54] GRANULAR PHENOLIC URETHANE MOLDING COMPOUNDS

[75] Inventors: Myron C. Annis, North Tonawanda; Donald W. Hoch, Tonawanda; Herman J. Harrington, North Tonawanda, all of N.Y.

[73] Assignee: Hooker Chemicals & Plastics Corporation, Niagara Falls, N.Y.

[21] Appl. No.: 693,814

[22] Filed: June 7, 1976

[51] Int. Cl.$^2$ .................... C08L 53/00; C08L 61/14
[52] U.S. Cl. .................... 260/37 N; 260/38; 260/841
[58] Field of Search ............ 260/77.5 CR, 841, 37 N, 260/38

[56] References Cited

U.S. PATENT DOCUMENTS

| | | | |
|---|---|---|---|
| 3,497,465 | 2/1970 | Kujawa et al. | 260/77.5 AP X |
| 3,523,093 | 8/1970 | Stamberger | 260/841 |
| 3,932,558 | 1/1976 | Kest et al. | 260/841 |

Primary Examiner—Sandra M. Person
Attorney, Agent, or Firm—Peter F. Casella; James F. Mudd; William G. Gosz

[57] ABSTRACT

Reactive mixtures comprising a polydienediol, an hydroxyalkylated novolac, and a polyisocyanate may be mixed with an inert filler composition to form granular molding compounds suitable for the preparation of molded articles having advantageous mechanical and electrical properties.

14 Claims, No Drawings

GRANULAR PHENOLIC URETHANE MOLDING COMPOUNDS

BACKGROUND OF THE INVENTION

This invention relates to granular phenolic-urethane molding compounds suitable for the preparation of molded articles having improved mechanical and electrical properties. More particularly it relates to granular molding compositions derived from hydroxyl terminated polydienes, hydroxyalkylated novolacs and polyisocyanates.

A wide variety of polyurethane compositions are known and used commercially in the preparation of molded articles, laminates, coatings, films, adhesives, rigid and flexible foams and the like. The great variation of polyurethane compositions and properties thereof stems from the ability of isocyanates to react with a wide variety of organic compounds having active hydrogen-containing groups. Among the many such compositions known in the art are polyurethanes prepared from polyisocyanates and various polyols, including for example polyether polyols, polyester polyols, polydienediols, novolacs, hydroxyalkylated novolacs and others. Thus, for example, in U.S. Pat. No. 3,728,293 it is disclosed that polyurethane compositions derived from specific mixtures of polyether polyols, novolac resins, and polyisocyanates, possess improved physical properties and self-extinguishing characteristics.

It is also known from U.S. Pat. No. 3,515,699, that thermoset molded articles, such as battery containers may be prepared from liquid reaction mixtures comprising an hydroxy-terminated polydiene, a polyether polyol and an organic diisocyanate.

It is further known from U.S. Pat. No. 3,515,772 that thermoset polymeric resins may be prepared from polydienes having functional end groups such as hydrogen or carboxy, a polyfunctional polyether, and a chain extender such as an organic diisocyanate or a polyanhydride such as an epoxy novolac.

Furthermore, it is known from U.S. Pat. No. 3,497,465 to prepare polyurethanes especially useful in low temperature applications from the reaction of an organic polyisocyanate with a composition comprising an hydroxyalkylated phenol-aldehyde resin, a polyol prepared by reacting a polyhydric alcohol and a mono epoxide, a dihydric alcohol such as ethylene glycol, an alkanolamine, and a phosphorus compound.

These and other polyurethane compositions provide a wide selection of desirable properties. Despite this wide selection of known compositions and properties, industry is constantly seeking new and better components and specific combinations of components for polyurethane compositions that will provide improved properties for various special applications.

Accordingly, it is an object of the present invention to provide granular molding compounds suitable for the preparation of molded polyurethane articles having excellent mechanical and electrical properties. It is a further object to provide novel and useful polyurethane compositions and articles prepared therefrom. These and other objects and advantages of the compositions of this invention will be apparent to those skilled in the art from the detailed description that follows.

SUMMARY OF THE INVENTION

It has now been found that reactive mixtures comprising an hydroxy terminated polydiene, an hydroxyalkylated novolac and a polyisocyanate may be copolymerized in the presence of a suitable catalyst to form polyurethane compositions suitable for use as thermoset adhesives, casting resins, and the like, and in the preparation of molding compounds. In a preferred form the reactive mixtures of this invention are mixed and/or kneaded with inert fillers to form a free-flowing, easily handleable, granular molding compound which may be reacted in situ during a molding operation to produce thermoset polyurethane molded articles.

Thus, this invention relates, in one aspect to reactive mixtures, comprising an hydroxy terminated polydiene, an hydroxyalkylated novolac, and a polyisocyanate and to the polyurethane reaction product thereof. In another aspect, this invention relates to reactive granular molding compositions and to the polyurethane compositions and molded articles prepared therefrom.

The granular molding compounds are prepared by combining the components of the reactive mixture, preferably in liquid form, with suitable inert fillers and intimately mixing or kneading until the material becomes dry and breaks into lumps or beads. The particles thus formed may be further ground or milled to a smaller particle size to provide a free-flowing granular composition. A suitable catalyst for the reactive mixture, such as a peroxide catalyst may be added in a subsequent mixing step or, preferably may be incorporated with the components of the reactive mixture during the mixing operation. The granular material, thus prepared, may be molded into useful articles by conventional molding procedures. When the granular molding compound is to be stored or shipped in commerce prior to use in a molding operation it is desirable to incorporate a suitable inhibitor to prevent or minimize premature polymerization of the reactive components.

The polyisocyanate component of the reaction mixture may be selected from a wide variety of organic polyisocyanates including for example, aliphatic, cycloaliphatic, and aromatic isocyanates. Diisocyanates are preferred, although in some cases isocyanates of higher functionality may be desirable. It is also preferred to employ isocyanates that are liquid at ordinary conditions, for example, 1,6-hexamethylene diisocyanate, toluene diisocyanate or the like. However solid isocyanates that are soluble or readily dispersible in the reaction mixture may be employed. Suitable isocyanates include, for example, 2,4-toluene diisocyanate, 2,6-diisocyanate, methylenebis (phenyl isocyanate), methylenebis (cyclohexyl isocyanate) hexamethylene diisocyanate, polyaryl polyisocyanates and the like as well as mixtures of such isocyanates.

The polydienediol component of the reaction mixture is a polymer or copolymer of a conjugated diene prepared by polymerization of one or more conjugated dienes such as 1,3-butadiene, 2-chloro-1,3-butadiene, 1,3-pentadiene, isoprene and the like or copolymerization of one or more of such conjugated dienes with one or more unsaturated monomers such as styrene, acrylonitrile, isobutylene and the like. The hydroxyl groups of the polydienediol are preferably located in the terminal positions. The preferred polydienediols are of the 1,2-isomeric form, that is, those having predominently pendant vinyl groups on alternate carbon atoms of the carbon chain, constituting at least about 60 percent of the olefinic unsaturation present and having a molecular weight in the range of about 500 to about 3000 and most preferably about 700 to about 1500. The preferred polydienediol is hydroxyl terminated 1,2-polybutadiene. The 1,2-polydienes may be prepared in a known manner, for example by anionic polymerization of a conjugated diene, such as 1,3-butadiene, in the presence of an alkali metal, such as lithium or sodium dispersed with the diene in a polar solvent. Terminal hydroxyl groups may be introduced onto the polydiene by known methods, for example by reaction with ethylene oxide which is capable of forming hydroxyl groups during polymerization.

The hydroxyalkylated novolac compositions utilized in the compositions of this invention are hydroxyalkylated novolacs having the formula:

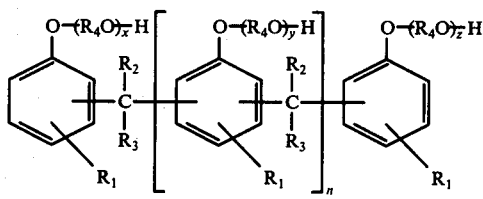

wherein
- $n$ has an average value of about 0.2 to 6, preferably about 0.5 to 3;
- $x$, $y$ and $z$ are integers from 1 to 25, preferably about 1 to 10;
- $R_1$ is independently selected from the group consisting of hydrogen, fluorine, chlorine, bromine, a hydrocarbon radical, halogen-substituted hydrocarbon radical; a hydrocarbon ketone radical and a hydrocarbon carboxylic radical;
- $R_2$ and $R_3$ are independently selected from the group consisting of hydrogen, a hydrocarbon radical, and a halogen substituted hydrocarbon radical; and
- $R_4$ is a hydrocarbon radical.
- Where $R_1$, $R_2$, $R_3$, and/or $R_4$ is a hydrocarbon or substituted hydrocarbon radical, the preferred hydrocarbon radicals are those containing up to about 12 carbon atoms.

The preferred hydroxalkylated novolacs are those characterized by the formula shown hereinabove where $R_1$, $R_2$, and $R_3$ are hydrogen and $R_4$ is a hydrocarbon radical containing 2 to 6 carbon atoms.

The hydroxyalkylated novolac can be prepared by reacting a fusible organic-solvent soluble condensation product of a phenol and an aldehyde or a ketone containing condensate units having reactive phenolic hydroxyl groups and a substance reactive with the phenolic hydroxyl groups selected from the group consisting of mono-oxirane ring compounds, alkylene halohydrins, alkylene carbonates, and mixtures thereof. A modified phenol can be used to prepare to oxyalkylated novolacs wherein the phenolic hydroxyl group is first reacted with one of the above substances, reacted with phenolic hydroxyl and subsequently the modified phenol is reacted with an aldehyde or ketone. Examples of suitable fusible organic solvent-soluble condensation products of a phenol, an aldehyde or ketone suitable for use in the preparation of the hydroxyalkylated novolacs of the invention are disclosed in U.S. Pat. No. 3,538,040, the disclosure of which is incorporated herein by reference.

The hydroxyalkylated novolac condensation products preferably contain no free reactive phenolic groups, i.e., less than about 5%, but preferably less than about 0.5% of the phenolic hydroxyl present originally in the phenol-aldehyde or phenol-ketone condensate.

The preferred method of hydroxyalkylation to produce the hydroxyalkylated novolacs useful in the invention is by reaction of said condensation products with compounds containing a mono-oxirane ring. Monomeric epoxides, such a ethylene oxide, propylene oxide, butylene oxide, cyclohexane oxide, or mixtures thereof are preferred. Catalysts for the reaction of the oxirane ring compounds and phenolic hydroxyl groups are alkali or alkaline earth hydroxides, primary amines, secondary amines, tertiary amines or basic alkali salts such as sodium, potassium, and lithium hydroxides; amines such as methyl, dimethyl, diethyl, tripropyl, and the like; salts of strong bases and weak acids, such as sodium acetate or sodium benzoate. The hydroxyalkylation reactions are typically carried out at 50°-250° C.

The phenolic hydroxyl of the phenolic condensates can also be hydroxyalkylated by reacting it with alkylene halohydrins using equivalent amounts of an alkali metal hydroxide to bring about the reacion. Suitable alkylene halohydrins include, for example, ethylene chloro or bromohydrins, propylene chloro or bromohydrins, 2,3-butylene chloro or bromohydrins, glycerol chloro or bromohydrins or the like, or mixtures thereof. Another method for hydroxyalkylating a phenolic novolac is by reaction with an alkylene carbonate, such as ethylene carbonate or propylene carbonate, using a catalyst such as sodium or potassium carbonate.

In the preparation of the reactive mixture, or reactive granular molding compounds of this invention it is preferred to combine the reactive components in proportions sufficient to provide about 80 to about 120 percent and most preferably about 100 percent of the theoretical isocyanate groups necessary to react with the hydroxyl groups present on the hydroxyalkylated novolac and polybutadienediol. The proportions of hydroxyl bearing components, that is the weight ratio plydiendiol: hydroxyalkylated novolac may vary within the ultimate limits of each but is preferably in the range of about to about 10:1, and, most preferably in the range of about 1:1 to about 1.5:1.

The polymerization of the reactive mixture is preferably effected with the aid of a suitable catalyst such as a free radical catalyst. Typical catalysts that may be employed for this purpose include benzoyl peroxide, tertiary butyl peroxide, acetyl peroxide, tertiary butyl perbenzoate, cumene hydroperoxide, tertiary butyl hydroperoxide dicumyl peroxide, and the like. Such catalysts are typically employed in proportions of about 0.01 to about 10 percent of the reactive mixture, depending on the efficiency of their action and whether or not substances which inhibit polymerization are present in the mixture. The polymerization reaction may also be hastened by the addition of a suitable promoter such as dimethyl aniline, usually in amounts equal to or smaller than the amount of catalyst employed.

When the reactive mixture of this invention or granular molding compound prepared therefrom, is to be shipped in commerce or stored for a period of time prior to molding or other use, it may be desirable to incorporate in the mixture a polymerization inhibitor, to prevent premature polymerization. Among the inhibitors that may be employed for this purpose are substances such as hydroquinone, tolyhydroquinone, benzoquinone, paratertiarybutyl catechol, trinitrobenzene, picric acid and the like. Such inhibitors are generally added in amounts in the order of about 0.001 to 1.0 weight percent of the reactive mixture.

In the preparation of the granular molding compounds of this invention the reactive mixture is combined with an inert filler composition in proportions dependent on the type of filler and the properties desired in the final molded article. The filler composition may be selected from a wide variety of known filler materials, especially those fillers known to be useful in the formulation of molding compounds based on phenolic resins. Thus, for example, fillers such as woodflour, cotton flock, chopped cloth, charcoal, chopped glass fibers, metal, or mineral fillers such as chopped asbestos, mica, silica, hydrate of alumina, magnesium oxide, and the like and mixtures of such fillers may be employed. The preferred filler compositions are those comprising predominently inert mineral fillers. The proportion of filler employed may vary widely, for example, from about 10 to about 90 percent by weight of the granular molding composition, but is preferably in the range of about 30 to about 70 percent by weight of the total granular molding composition.

The granular molding compounds are prepared by mixing the components of the reactive mixture, preferably but not necessarily in liquid form, with inert fillers, preferably mineral fillers such as magnesium oxide, silica, alumina hydrate and the like, reinforcing agent such as asbestos fiber, silica fiber, chopped glass fibers and the like, and a plasticizer such as dibutylphthalate, diallylphthalate and the like, with the aid of suitable mixer such as a pug mill or a sigma blade mixer. A catalyst and/or inhibitor may be incorporated in the molding compound during the mixing step, if desired.

It is to be understood that dyes, pigments, lubricants, plasticizers, fire retardants and various other adjuvants and modifying agents may be incorporated in the compositions of this invention in order to obtain or accentuate any given property of the reactive mixture, the granular molding compound or articles prepared therefrom.

The granular molding compounds of this invention are suitable for use in conventional molding processes and equipment such as compression molding, transfer molding, and the like that may be employed for the production of articles from phenolic resin molding compounds. Typically, the pressure will be in the range of about 500 to about 3000 pounds per square inch and the temperature about 150° to about 200° C. during the molding operation. During molding, the granular molding compound is shaped and reacted, resulting in a molded article of thermoset phenolic-urethane composition.

The following examples will serve to further illustrate this invention. It is to be understood that the specific details of the examples are presented for purposes of illustration and are not to be construed as a limitation on the invention. In the examples and elsewhere in the specification and claims, unless otherwise indicated, all parts and percentages are by weight and all temperatures are in degrees Celsius.

EXAMPLE I – PREPARATION OF HYDROXYALKYLATED NOVOLAC

A typical modified phenol-aldehyde condensation product was prepared by introducing 3,000 parts phenol, 13 parts of oxalic acid catalyst and 6 parts of an alkylaryl sulfonate wetting agent into a jacketed reactor and heating to 100° C. Then 1,110 parts of a 37 percent aqueous formaldehyde solution were added to the reactor at such a rate that the heat of reaction provided a vigorous reflux. Refluxing was continued for two hours after the completion of the formalin addition. The reactor contents were dehydrated at 180° C and then dephenolated at 200° C at 50 millimeters vacuum. Approximately 2,030 parts of phenol-aldehyde condensate were produced. Then 7.2 parts of sodium hydroxide were introduced to the reactor. Ethylene oxide was then added while the reactor temperature was maintained at 190° C for an initial 2 hours and then permitted to increase to the range of 200° to 220° C until the addition of 21,950 parts of the ethylene oxide was complete. The resulting condensation product had an hydroxyl number of 267, and a Gardner viscosity at 50° C of about 23 seconds.

EXAMPLES 2 and 3 – PREPARATION OF GRANULAR MOLDING COMPOUND

EXAMPLE 2

A mixture of 720 parts of an hydroxyl-terminated 1,2-polybutadiene (m.w. about 1000, about 80% of the unsaturation present being of the 1,2-form), 480 parts of an hydroxypropylated novolac (prepared as in Example 1); 12 parts of an alkyl phosphate mixture mold release agent, 50 parts of dibutylphthalate plasticizer, and 25 parts of a gamma aminopropyl triethoxy silane coupling agent was added to a preheated sigma blade mixer and mixed for about 5 minutes at about 50°–70° C. The temperature was maintained and mixing continued while the following components were added at about 5 minute intervals: diamyl peroxide catalyst on a siliceous base, 150 parts; magnesium oxide, filler, 30 parts; blue dye mix, supported on an inert siliceous base, 208 parts; 1/8-inch chopped glass, 560 parts; silicon dioxide filler, 1950 parts; and hydrate of alumina filler, 1500 parts. Temperature controls were removed and the mixture was allowed to cool to ambient temperature while mixing continued. Following a 15 minute interval, 396 parts of a liquid diisocyanate [Isonate 143L, Upjohn Co., a modified methylenebis (phenyl isocyanate)] was added, followed by 15 parts of zinc stearate lubricant and mold release agent. Mixing was continued for about 15 minutes until the material become dry and broke into small lumps and beads. The resultant lumpy material was reduced in size in a hammer mill, to form a granular, free-flowing material having a particle size of about ⅛ inch.

EXAMPLE 3

A granular molding compound was prepared following the procedure of Example 2 except that the composition was varied as follows:

| Components | Parts by Weight |
| --- | --- |
| Hydroxy-terminated polybutadiene | 720 |
| Hydroxypropylated novolac (of Ex. 1) | 480 |
| ⅛″ chopped glass | none |
| Gamma aminopropyl triethoxy silane coupling agent | 25 |
| Methylenebis (phenyl isocyanate) | 396 |
| Diamyl peroxide catalyst on siliceous support | 150 |
| Dibutylphthalate plasticizer | 48 |
| Magnesium oxide | 30 |
| Blue dye mix on siliceous base | 206 |
| Zinc stearate | 10 |
| Silicon dioxide filler | 2250 |
| Hydrate of alumina filler | 1750 |

| Components | Parts by Weight |
| --- | --- |
| Alkyl phosphate mold release agent | 12 |

EXAMPLES 4 AND 5 - PREPARATION AND PROPERTIES OF MOLDED ARTICLES

Samples of the granular molding compounds prepared as in Examples 2 and 3 were compression molded at 170° C. and a pressure of about 2500 pounds per square inch for 5 minutes following the procedure of ASTM-D796. The molded samples were tested for mechanical and electrical properties with the following results.

| Test Property | ASTM Test Method | Ex. 4 (From molding compound of Ex. 2) | Ex. 5 (From molding compound of Ex. 3) |
| --- | --- | --- | --- |
| Molded Gravity | D792 | 1.80 – 1.85 | 1.80 – 1.85 |
| Mold Shrinkage (inches/inch) | D955 | 0.005 – 0.008 | 0.008 – 0.012 |
| Flexural Strength (p.s.i.) | D790 | 10400 | 10600 |
| Tensile Strength | D638 | 4800 | 5500 |
| Izod Impact (ft.-lbs./inch) | D256 | 0.37 | 0.33 |
| Modulus in Tensile (p.s.i. $\times 10^6$) | D790 | 1.4 | 1.2 |
| Dielectric Strength (volts/mil) | D149 | | |
| S/T | | 461 | 399 |
| S/S | | 350 | 350 |
| Volume Resistivity (ohm-cm) | D257 | $4.3 \times 10^{15}$ | $1 \times 10^{15}$ |
| Dielectric Constant | D150 | | |
| at 5 OHz | | 4.27 | 4.2 |
| 1 KHz | | 4.19 | 4.12 |
| 1 MH$_z$ | | 4.13 | 4.02 |
| Arc Resistance (sec.) | D495 | 194 | 197 |
| Water Absorption (% wt change) | D570 | 0.05 | |
| Deflection Temperature (° F at 264 p.s.i.) | D648 | 380 | 380 |

Molded specimens prepared as in Examples 4 and 5 were found to exhibit excellent weatherability based on visual observation over a period of 1 year exposure to sunlight and atmosphere. In addition, the specimens exhibited excellent resistance to degradation when exposed to boiling solutions of acids and bases.

What is claimed is:

1. A thermosetting, reactive granular molding compound consisting essentially of a mixture of:
   A. a polydienediol;
   B. An organic polyisocyanate;
   C. an hydroxyalkylated novolac of the formula:

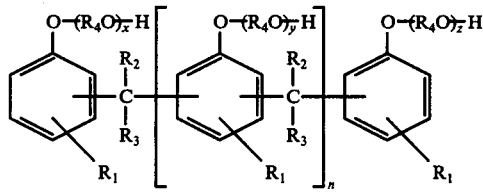

wherein
n has an average value of about 0.2 to 6;
x, y and z are integers from 1 to 25;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen substitued hydrocarbon radical; and
$R_4$ is a hydrocarbon radical; and
D. inert fillers.

2. A molding compound according to claim 1 wherein the polydienediol is an hydroxyl-terminated polydiene having at least about 60 percent of the olefinic unsaturation present in the form of 1,2-type of unsaturation.

3. A molding compound according to claim 2 wherein the polyisocyanate is a diisocyanate.

4. A molding compound according to claim 3 wherein the polydienediol is an hydroxyl-terminated polybutadiene.

5. A molding compound according to claim 4 wherein the proportion by weight of hydroxyl-terminated polydiene: hydroxyalkylated novolac is about 0.1:1 to about 10:1 and the organic diisocyanate is present in an amount sufficient to provide a ratio of NCO-:OH in the range of about 0.8:1 to about 1.2:1.

6. A molding compound according to claim 4 wherein the weight proportion of hydroxyl-terminated polydiene: hydroxyalkylated novolac is in the range of about 1:1 to about 1.5:1.

7. A molding compound according to claim 6 wherein the hydroxyalkylated novolac is characterized by the formula:

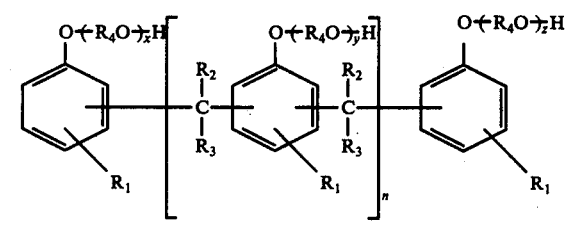

wherein:
n has an average value of about 0.5 to about 3;
x, y, and z are integers of from about 1 to about 10;
$R_1$, $R_2$, and $R_3$ are hydrogen; and
$R_4$ is ethylene or propylene or a mixture thereof.

8. A molding compound according to claim 7 consisting essentially of about 30 to about 70 weight percent of inert mineral fillers.

9. A molding compound according to claim 8 wherein the organic polyisocyanate is methylenebis (phenyl isocyanate).

10. A molding compound according to claim 9 wherein the inert mineral fillers are selected from the group consisting of magnesium oxide, alumina hydrate, silicon dioxide and mixtures thereof.

11. A molding compound according to claim 10 wherein a glass fiber reinforcing agent is present.

12. A molded article prepared by reacting and molding the granular molding compound of claim 1 in the presence of a free radical catalyst.

13. A thermosetting reactive mixture consisting essentially of

A. a polydienediol;

B. an organic polyisocyanate;

C. an hydroxyalkylated novolac of the formula:

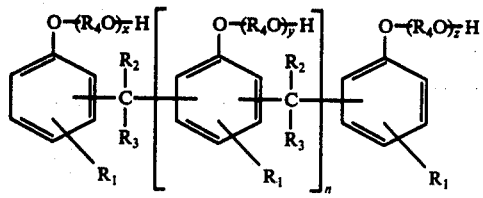

wherein
n has an average value of about 0.2 to 6;
x, y and z are integers from 1 to 25;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen substituted hydrocarbon radical; and
$R_4$ is a hydrocarbon radical.

14. A polymeric product obtained by reacting the mixture of claim 13 in the presence of a free radical catalyst.

* * * * *